United States Patent [19]

Chang et al.

[11] Patent Number: 5,706,516
[45] Date of Patent: Jan. 6, 1998

[54] SYSTEM FOR COMMUNICATING MESSAGES AMONG AGENT PROCESSES

[75] Inventors: David Yu Chang; Marc Gregory Smith, both of Austin, Tex.

[73] Assignee: International Business Machines Corporation, Armonk, N.Y.

[21] Appl. No.: 376,707

[22] Filed: Jan. 23, 1995

[51] Int. Cl.$^6$ ..................................................... G06F 13/14
[52] U.S. Cl. ...................... 395/680; 395/601; 395/200.01
[58] Field of Search ........................................ 395/650, 700, 395/680, 200.01, 683, 601, 604; 364/284.3, 284.4, 940.64, 941.4

[56] References Cited

U.S. PATENT DOCUMENTS

| | | | |
|---|---|---|---|
| 4,384,322 | 5/1983 | Bruce et al. | 364/200 |
| 4,570,220 | 2/1986 | Tetrick et al. | 364/200 |
| 4,621,359 | 11/1986 | McMillen | 370/60 |
| 4,785,396 | 11/1988 | Murphy et al. | 364/200 |
| 4,807,109 | 2/1989 | Farrell et al. | 364/200 |
| 4,937,737 | 6/1990 | Schwane et al. | 364/200 |
| 4,942,602 | 7/1990 | Baker, Jr. et al. | 379/212 |
| 4,943,996 | 7/1990 | Baker, Jr. et al. | 379/96 |
| 4,949,373 | 8/1990 | Baker, Jr. et al. | 379/96 |
| 4,982,187 | 1/1991 | Goldstein et al. | 340/825.79 |
| 4,989,131 | 1/1991 | Stone | 364/200 |
| 5,036,459 | 7/1991 | den Haan et al. | 364/200 |
| 5,142,683 | 8/1992 | Burkhardt, Jr. et al. | 395/725 |
| 5,241,628 | 8/1993 | Solari | 395/325 |
| 5,253,342 | 10/1993 | Blount et al. | 395/200 |
| 5,274,774 | 12/1993 | Manber et al. | 395/325 |
| 5,280,591 | 1/1994 | Garcia et al. | 395/325 |
| 5,481,720 | 1/1996 | Loucks et al. | 395/200 |

OTHER PUBLICATIONS

Theimer et al, "Heterogeneous Process Migration by Recompilation" IEEE Distributed Computing Systems, Jul. 91 International Conference, pp. 18–25.

Dineen et al, "The Network Computing Architecture and System: An Environment for Developing Distributed Applications", IEEE, May 88.

*Primary Examiner*—Alvin E. Oberley
*Assistant Examiner*—Michael T. Richey
*Attorney, Agent, or Firm*—Clark, Thomas & Winters a P. C.

[57] ABSTRACT

Data processing application requests are processed in a computer system configured as a plurality of nodes with a plurality of interacting processes. Data is requested by an application request originating on a first node. The request data includes data located on a plurality of the nodes. A portion of computer memory on the nodes is established as agent message queues ("AMQ's"). A first process, acting as a coordinating agent, receives an application request on the first node. The coordinating agent generates a plurality of internal requests for the application request. The coordinating agent communicates the internal requests to a fast communication manager process ("FCM") on the first node. The first FCM, sends the internal requests to FCM's on the nodes having the request data ("request data nodes"), for storage in selected AMQ's on the request data nodes. The internal requests are retrieved from the selected AMQ's by processes acting as subordinate agents on the request data nodes. The subordinate agents may currently process the internal requests.

5 Claims, 8 Drawing Sheets

SYSTEM FOR COMMUNICATING MESSAGES AMONG AGENT PROCESSES

CROSS REFERENCE TO RELATED APPLICATIONS

This application is related to two co-pending applications entitled (1) "System for Coordinating the Assignment of Agent Processes to Data Processing Requests," U.S. patent application Ser. No. 08/355,861 and (2) "System for Allocating Resources Among Agent Processes," 08/355,885, filed on Dec. 14, 1994, both filed on the same date as this application which are hereby incorporated by reference. This application and the two related applications are all assigned to the same assignee.

BACKGROUND OF THE INVENTION

1. Field of the Invention

This invention relates generally to parallel processing of data processing requests, and, more particularly, to concurrent processing on a plurality of nodes by interacting processes.

2. Background Art

Due to the increasing speed and decreasing cost of microprocessors, it is increasingly useful to perform parallel processing in multi-node, microprocessor-based computer systems. Applications for parallel processing include numerical calculation and database processing. This processing of numerous applications concurrently among different nodes may be divided into (a) off-line tasks, wherein application requests in a high level language are compiled into a lower level language such as an assembly language, (b) run-time tasks, wherein the concurrent processing of the compiled instructions is coordinated, and (c) system administration, wherein the system is configured and performance is monitored. The invention described herein primarily concerns parallel processing run-time tasks.

The multi-node, microprocessor-based computer systems which perform parallel processing may have a variety of architectures, ranging from systems having elaborate, high speed communication channels and shared memory, to systems with loosely-coupled communication and no shared memory. The present invention concerns the simpler architecture of multi-node systems with loosely-coupled communication and no memory shared among nodes.

SUMMARY OF THE INVENTION

An objective of the invention is to provide a fast communication message service for processing data requests by a plurality of agent processes on a plurality of nodes, where messages may be between agents on a single node or between agents on different nodes.

Another objective is to enable concurrent processing of one or more data requests, where a request requires data from a plurality of the nodes. As used herein, "concurrent processing" includes processing, at least in part, during a common time interval.

According to the present invention, the foregoing and other objects are attained by processing data processing application requests in a computer system configured as a plurality of nodes, where a node has memory for storing data and a plurality of interacting software processes. A portion of computer memory on the nodes is established as agent message queues ("AMQ's"). An application request is received by a first process, which acts as a coordinating agent. The coordinating agent generates an internal request by processing a low level request compiled from the application request, and sends the internal request for storage in an AMQ. A second process, acting as a subordinate agent, retrieves the internal request from the AMQ.

In a further aspect of the invention, a node has a fast communication manager ("FCM") process so that an FCM on a first node communicates messages from agents on the node to an FCM on a second node, for communicating to agents on the second node. When the coordinating agent sends an internal request for storage in an AMQ, the coordinating agent communicates the internal request to the FCM on the coordinating agent's node and the FCM sends the internal request for storage in the AMQ.

In a still further aspect, the application request originates on a first node and includes a request, in a format not specific to the computer system node configuration, for the processing of data ("request data"). The request data is located on a second node. The coordinating agent adds access authorization to the low level request, for authorizing access to the request data, and an access location, for identifying the request data location, so that the internal request is specific to the computer system configuration. The first FCM communicates the internal request to the second FCM. The second FCM, located on the second node, stores the internal request in the AMQ on the second node.

In one feature of the invention, the request data includes data located on a plurality of nodes, including at least a third node, and the coordinating agent also generates a second internal request for the application request, for processing by a second subordinate agent on the third node. The first FCM also communicates the second internal requests to a third FCM on the third node. The third FCM stores the second internal request in a second AMQ on the third node for retrieval by a second subordinate agent. Also, the first and second subordinate agents may concurrently process the first and second internal requests. More generally stated, the coordinating agent may generate n internal requests for the application request, for processing by n subordinate agents on n nodes having the request data. The first FCM communicates the n internal requests to FCM's on the n nodes. The FCM's store the n internal requests in AMQ's on the n nodes. (It should be understood that this includes the first FCM communicating n−1 internal requests to FCM's on n−1 nodes, and the first FCM storing one of the internal requests on the first node, if the first node is one of the n nodes having the request data.) The n subordinate agents may concurrently process the n internal requests.

According to another aspect of the invention, a number of internal requests are stored in a number of AMQ's and are identified with universal unique identifiers ("UUID's"). An internal request's UUID is also stored in the AMQ where the internal request is stored. When an internal request is stored in an AMQ the AMQ is designated as being busy. The AMQ's not having an internal request are designated as free AMQ's. An FCM, having an internal request for storage in an AMQ on the FCM's node, tests busy AMQ's on the node to determine if an AMQ has the UUID of the internal request, selects a busy AMQ for storing the internal request if the AMQ has the UUID of the internal request, and selects a free AMQ for storing the internal request if none of the AMQ's tested have the UUID.

In a further aspect, a subordinate agent that is processing an internal request tests to determine whether an application state anchor block ("ASAB") has been established. An ASAB is a block of memory used for recording information about the state of the application request from which an internal request was generated. If the subordinate agent determines that there is no ASAB for an internal request, the agent establishes an application state anchor block and stores the address for the ASAB into the AMQ from which the subordinate agent retrieved the internal request so that any agent subsequently servicing an internal request having the same UUID may determine the existence and address of the ASAB.

In another aspect, the nodes have parallel database ("PDB") queues for storing references to internal requests. When an FCM stores an internal request in an AMQ so that the internal request may be retrieved by a subordinate agent, the FCM also stores an address of the AMQ in the PDB queue. A subordinate agent detects an internal request that is waiting for an agent by testing for an address in the PDB queue.

The invention is intended to be limited only as defined in the claims. Additional objects, advantages, and novel features are set forth in the following description, or will be apparent to those skilled in the art or those practicing the invention. Other embodiments are within the spirit and scope of the invention. These objects and embodiments may be achieved by the combinations pointed out in the appended claims.

DESCRIPTION OF THE INVENTION

Figure 1:
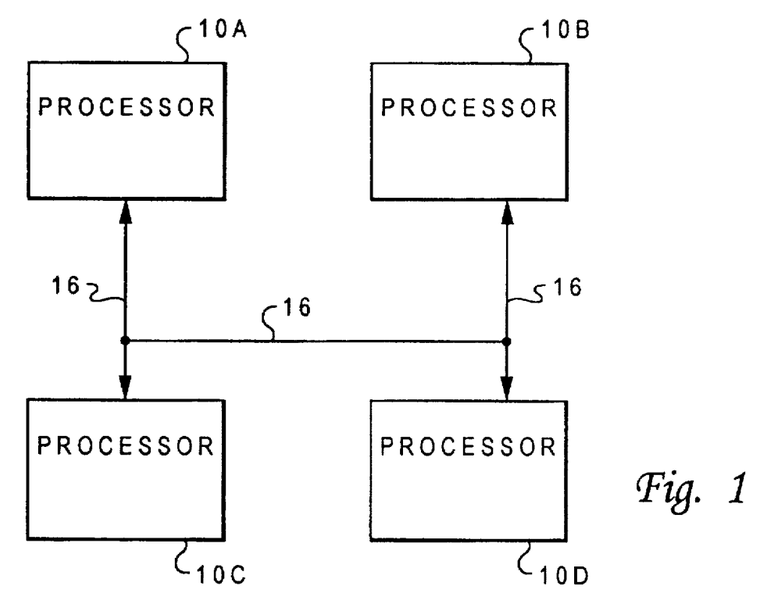
FIG. 1 is a functional block diagram of a plurality of processor units ("nodes") interconnected through a communications link.

FIG. 1 is a block diagram of a multi-processor computer system in which the processing system of the present invention may be advantageously employed. As shown in FIG. 1, the multi-processor computer system comprises a plurality of processor units 10A–10D and communications links 16 for interconnecting the processor units 10A–10D (also referred to as "nodes"). Although only 4 processor units 10A, 10B, 10C and 10D are shown, the actual number of processor units in the network can be more or less.

Figure 2:
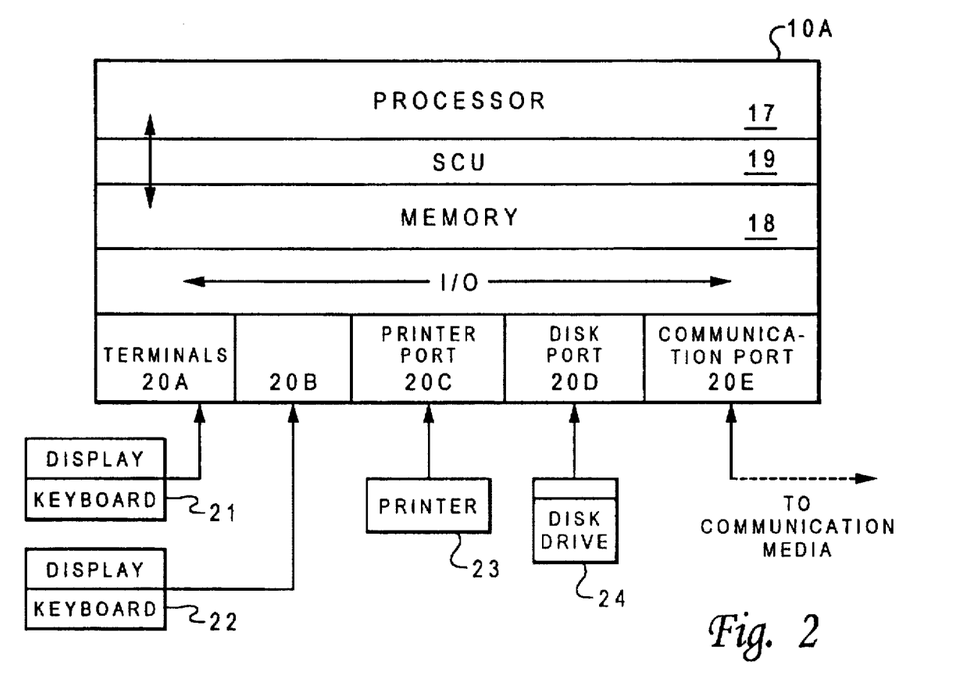
FIG. 2 is a block diagram of one of the processor units shown in FIG. 1, illustrating the various hardware functions that are incorporated into one of the units.

In FIG. 2, a processor unit 10A shown in FIG. 1 is disclosed in more detail. The processor unit may be a personal computer or an engineering work station, such as one having RS/6000 architecture running the IBM AIX™ operating system. ("AIX" is a trademark of IBM corporation.) It should be noted, however, that other architectures and operating systems may be employed in practicing the invention.

The processor unit 10A, may comprise a processor 17, main memory 18, a storage control unit ("SCU") 19, which controls the transfer of data between the processor 17 and memory 18, and a plurality of input/output ports 20A through 20E. In the example depicted in FIG. 2, ports 20A and 20B function to connect display type 21 and 22 terminals to the processor unit 10; port 20C connects a printer 23 to the processor unit 10A; and port 20D connects disk drive memory 24 to the processor unit 10A. Other combinations of storage devices and peripheral devices may be employed in practicing the invention.

A communication input/output adapter, preferably a serial link adapter ("SLA"), is employed to connect the port 20E of the processor unit 10A to the communications link 16 in FIG. 1, so that the node 10A can transfer data rapidly directly to another node.

Figure 3:
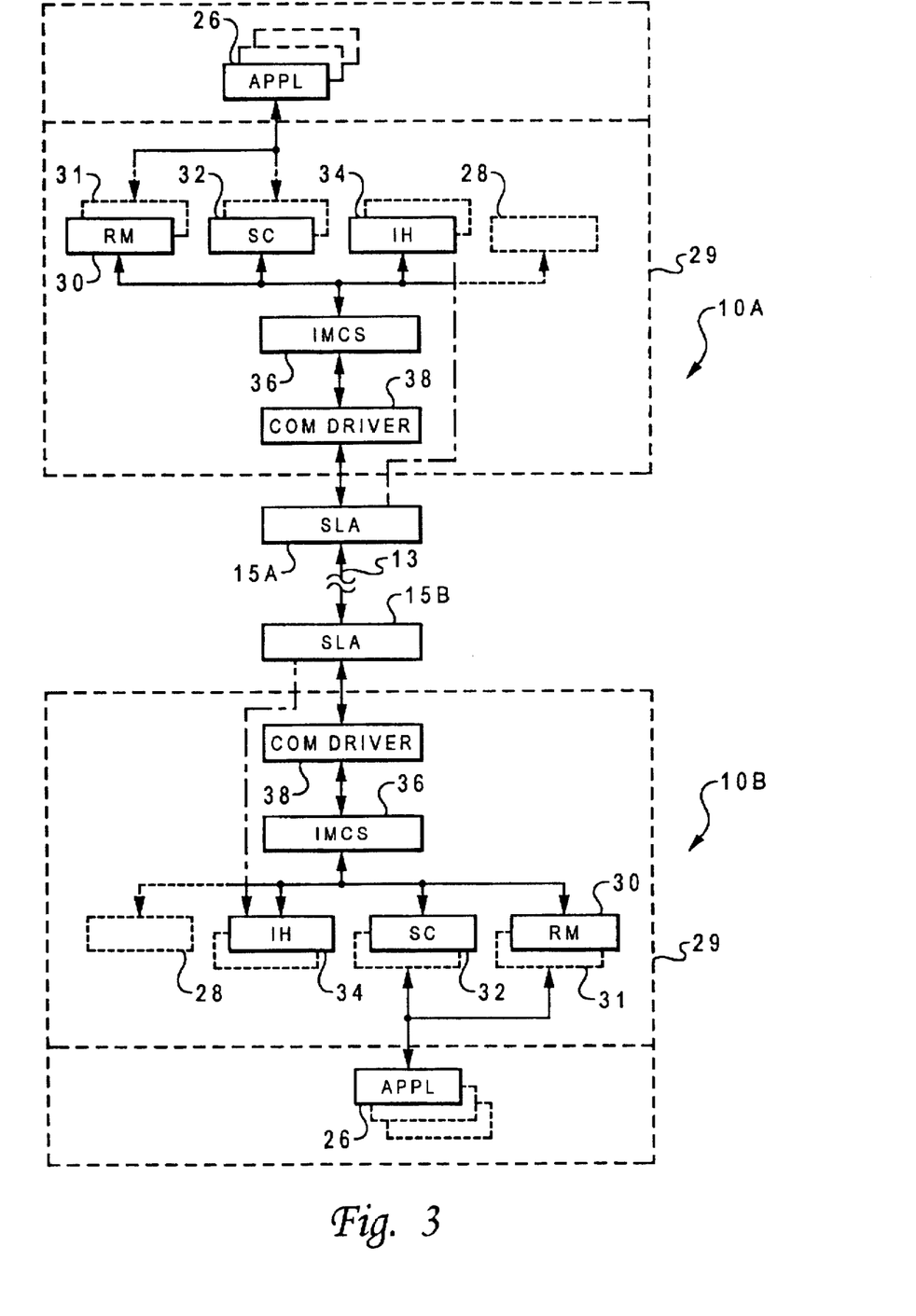
FIG. 3 is a block diagram of two of the processing units shown in FIG. 1, illustrating various software functions that are incorporated in the units and the communication link for sending messages therebetween.

The present invention facilitates loosely coupled communication between the nodes 10A, 10B, etc., where one node does not have direct access to memory of another node. The preferred communications link 16, is a serial link. As shown in FIG. 3, the serial link includes a transmission cable 13, such as a coaxial cable or a fiber optic cable and serial link adapters (SLA) 15A and 15B at each end thereof to interconnect to the respective ports 20E of nodes 10A and 10B. The link 16 fetches the data from the memory 18 of one processor unit 10A and deposits it in the memory 18 of another processor unit 10B. The serial link adapters 15A and 15B implement a link level device protocol which ensures that the data transfer takes place correctly. There are numerous protocols which can be used with the link 16, including protocols such as ethernet or token ring.

Processor 17 FIG. 2 may be a Power PC™ microprocessor, for example; however, the invention is not limited to any particular hardware. ("PowerPC" is a trademark of IBM Corporation.)

In FIG. 3, the software resources associated with each node 10A and 10B may include a plurality of applications software 26 built on top of a plurality of operating system services 28 in the operating system 29. These system services 28 include various resource managers 30, which allocate the hardware resources of the node 10, system calls 32 which service the requests of applications software 26 for services such as file access, and interrupt handlers 34 which react to asynchronous events such as the completion of an input/output event. Resource managers 30 may include a lock manager or a virtual memory manager 31.

These essential system services 28 are commonly described as being part of the kernel of the operating system 29. The kernel typically includes only the basic functions of the operating system 29 without which the operating system is not available or which may affect all the users or the state of the system and are hence privileged. Hence, the kernel must be reliable, and access to the kernel must be controlled. There are other operating system components, such as compilers and utilities, which do not require privileges to perform their services. As a result, they are not part of the kernel.

Figure 4:
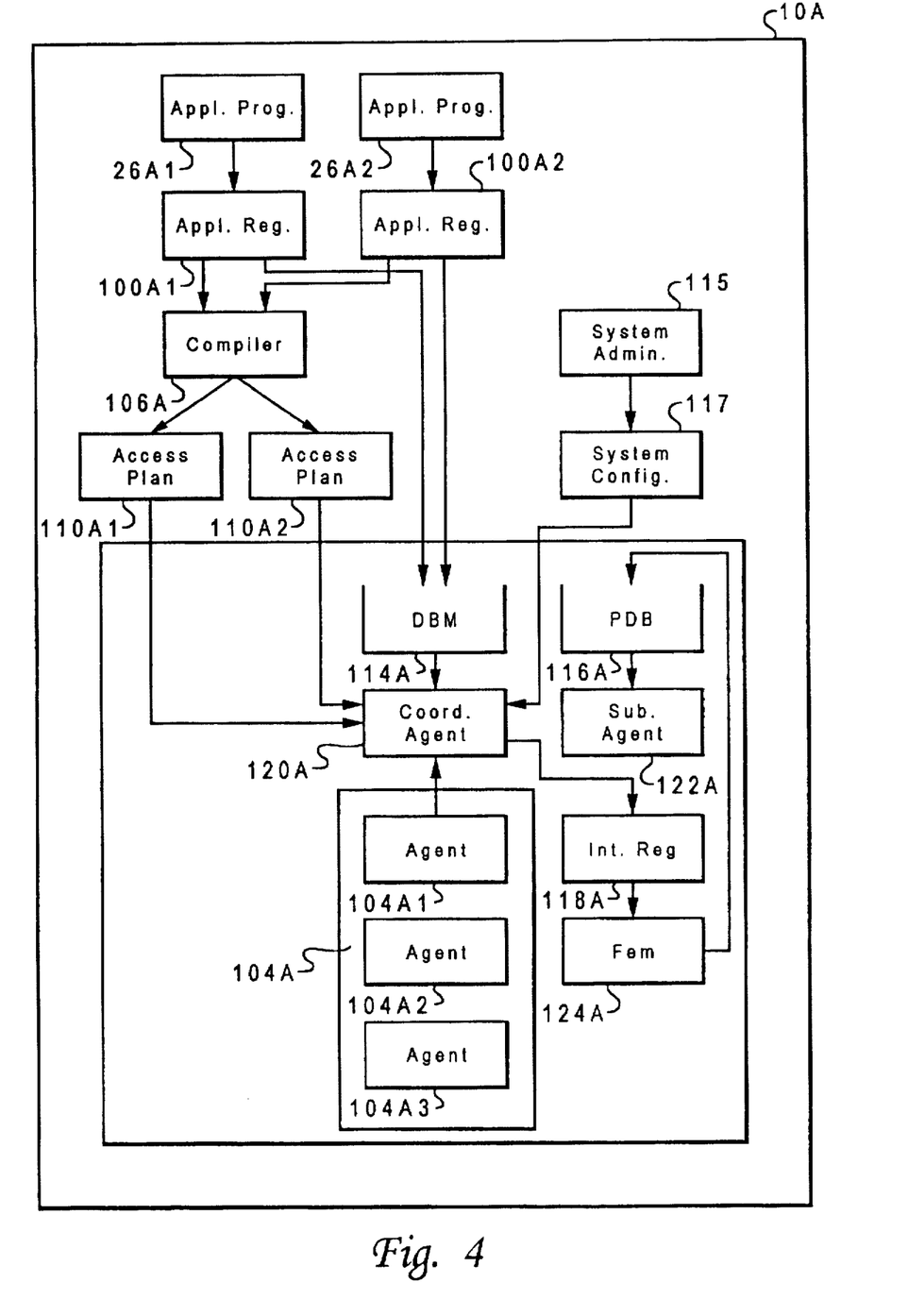
FIG. 4 illustrates interaction between an application program and a database manager program on one of the nodes, and shows a pool of agents and the database manager and parallel database queues with agents assigned to the queues.

Referring now to FIG. 4, a program, such as an application program 26A1 on node 10A, may generate an application request 100A1 which is a high level request such as in a standard language, like Structured Query Language, and is not specific to any particular data processing system or system configuration. A parallel processing management program 102A running on a node 10A, has a pool 104A of concurrently executing processes (also referred to as "agents") 104A1, 104A2, etc. for handling such data processing application requests 100A1, 100A2, etc., including searching, sorting, storing and retrieving data from memory in the interconnected nodes 10A, 10B, etc. Similarly, other nodes 10B, 10C, etc. have programs 102B, 102C, etc. with pools of agents 104B, 104C, etc. In the preferred embodiment of the present invention the parallel processing management program 102 is a database management ("DBM") program for database processing, and the data processing application requests are database requests. The data which is stored in and retrieved from memory by the DBM program may include data which is organized in tables of related data. The data in a single table may be located in memory 18 or 24 on a plurality of nodes 10.

Figure 7:
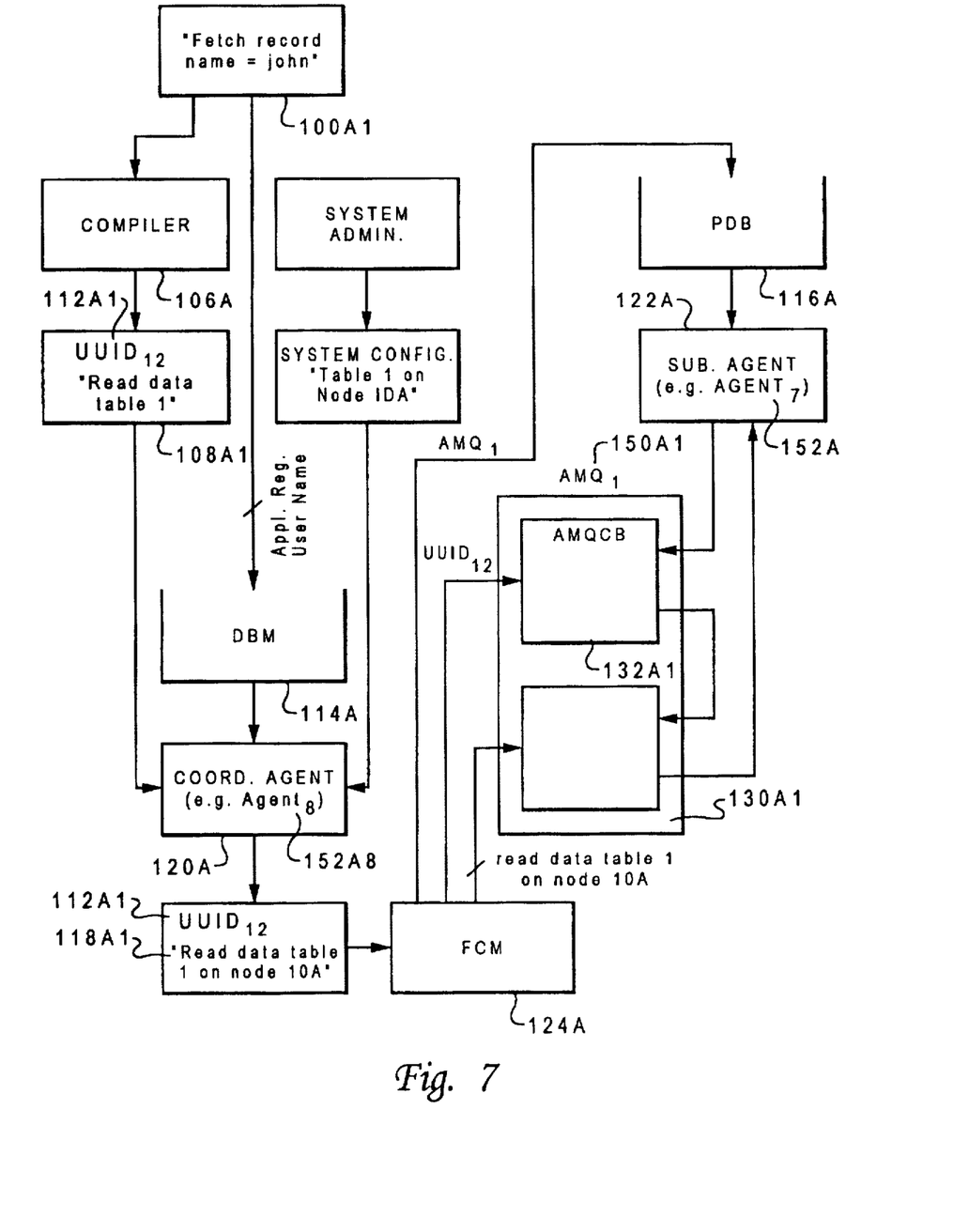
FIG. 7 shows a request being identified, stored, and passed among agents according to the system of queues and addressing.

Prior to run-time execution, the system administrator establishes a database node configuration which identifies the locations of data within the system. Also, as depicted in FIG. 7, application requests 100A are compiled by compiler 106A into low level requests 108A, such as in an assembly language. For example, an application request "Fetch record name=John" may be compiled into a number of low level requests:

load table john locate data of table 1 read data build data access table cursor control block etc.

For each application program 26A1, such as program 26A1 and program 26A2 shown, from which application requests, such as requests 100A1 and 100A2 shown, are compiled, an access plan, such as access plan 110A1 and access plan 110A2 shown, is established for storing low level requests, along with universal unique identifier numbers ("UUID's") 112A, which are assigned to the low level requests 108A. A UUID assignment does not determine which agent will handle a request because the agents themselves determine the initial assignment of a request to an agent, as will be described below. However, by assigning a second request to the same UUID as a first request, the compiler will cause the second request to be handled by the same agent that handled the first request, whichever agent that may have been. The compiler may select to assign two requests the same UUID, for example, in the case where the requests are for records from a common data table.

During run-time, a user application program 26A1 generates an application request 100A1 corresponding to one of the application requests 100A1 that has been compiled into low level requests 108A1. The DBM program 102A has a database manager queue ("DBM queue") 114A for storing application requests 100A and a parallel database queue ("PDB queue") 116A for internal requests 118A generated from the low level requests 108A. Request 100A1 is put into the DBM queue 114A along with the name of user that originated the request. An agent 120A assigned to DBM queue 114A from the pool 104A of agents 104A1, 104A2, etc. is assigned to a request 100A1. The low level requests 108A1 compiled from application request 100A1 are stored in a portion of the access plan 110A1 for the application program 26A1 which generated the request 100A1. The coordinating agent 120A assigned to the request 100A1 gets the low level requests 108A1 and combines them with addressing information from the system configuration and access authorization information derived from the system configuration and from the user name, thereby generating an internal request 118A for handling by an agent 122A assigned to PDB queue 116A from the pool 104A of agents 104A1, 104A2, etc.

All of the agents 104A1, 104A2, etc. in the pool 104A are capable of servicing either the application requests 100A from the DBM queue 114A or the internal requests 118A from the PDB queue 116A. While an agent is servicing a request from the DBM queue it is referred to as a "coordinating agent". While an agent is servicing a request from the PDB queue, the agent is referred to as a "subordinate agent".

Since the coordinating agent 120A provides addressing information and access authorization to the compiled requests 108A, the application program and the compiler may be independent of the system configuration, and a subordinate agent may process interval requests independently of the application users. Since the DBM program 102A, coordinate agent 120A, and subordinate agent 122A exchange only those requests which have been compiled from external application requests 100A1, 100A2, etc., and have been supplemented with access authorization, interagent communication does not require detailed error checking, such as that which a transport layer communications protocol ordinarily provides. The DBM program 102A therefore provides a fast communications process (referred to herein as the "fast communications manager" or "FCM") 124A with reduced error checking for coordinating communication between agents.

Figure 5:
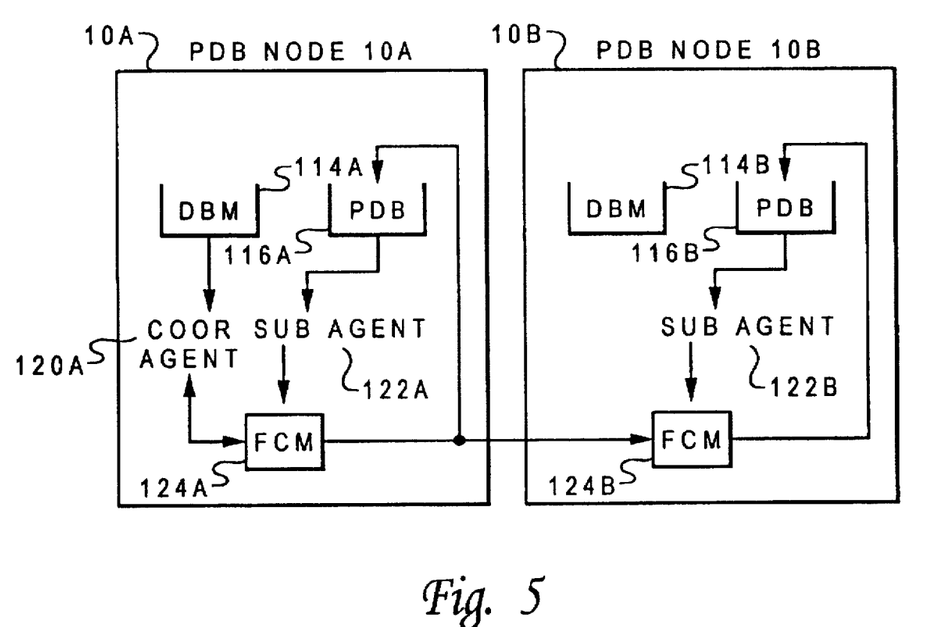
FIG. 5 shows two nodes and illustrates interagent communication within a node and between nodes.

Interagent communication is shown in greater detail in FIG. 5. Application requests 100A on node 10A are received by coordinate agent 120A and the resulting internal requests 118A (FIG. 4) are communicated through FCM 124A to PDB queue 116A and, if a request 118A involves memory on node 10B, the request 118A is also communicated by FCM 124A to the node 10B FCM 124B, which puts the request 118A into the node 10B PDB queue 116B. After a subordinate agent 122B assigned to a PDB queue 116B has received a request 118A the agent 122B may communicate information about the request 118A to its FCM 124B. The FCM 124B communicates through FCM 124A to agent 120A on the node 10A where the request originated.

Data required for an application request, such as application request 100A1 on node 10A, may be located on a number of nodes, such as nodes 10B and 10C. A number of internal requests 118A may be generated on the originating node 10A. A first internal request 118A, generated from the application request 100A1, may then be sent to one node 10B, while a second internal request 118A, generated from the application request 100A1, is sent to the other node 10B, so that a subordinate agent 122B on node 10B may process the first internal request 118A, while another subordinate agent 122C may process the second internal request 118A.

Figure 6:
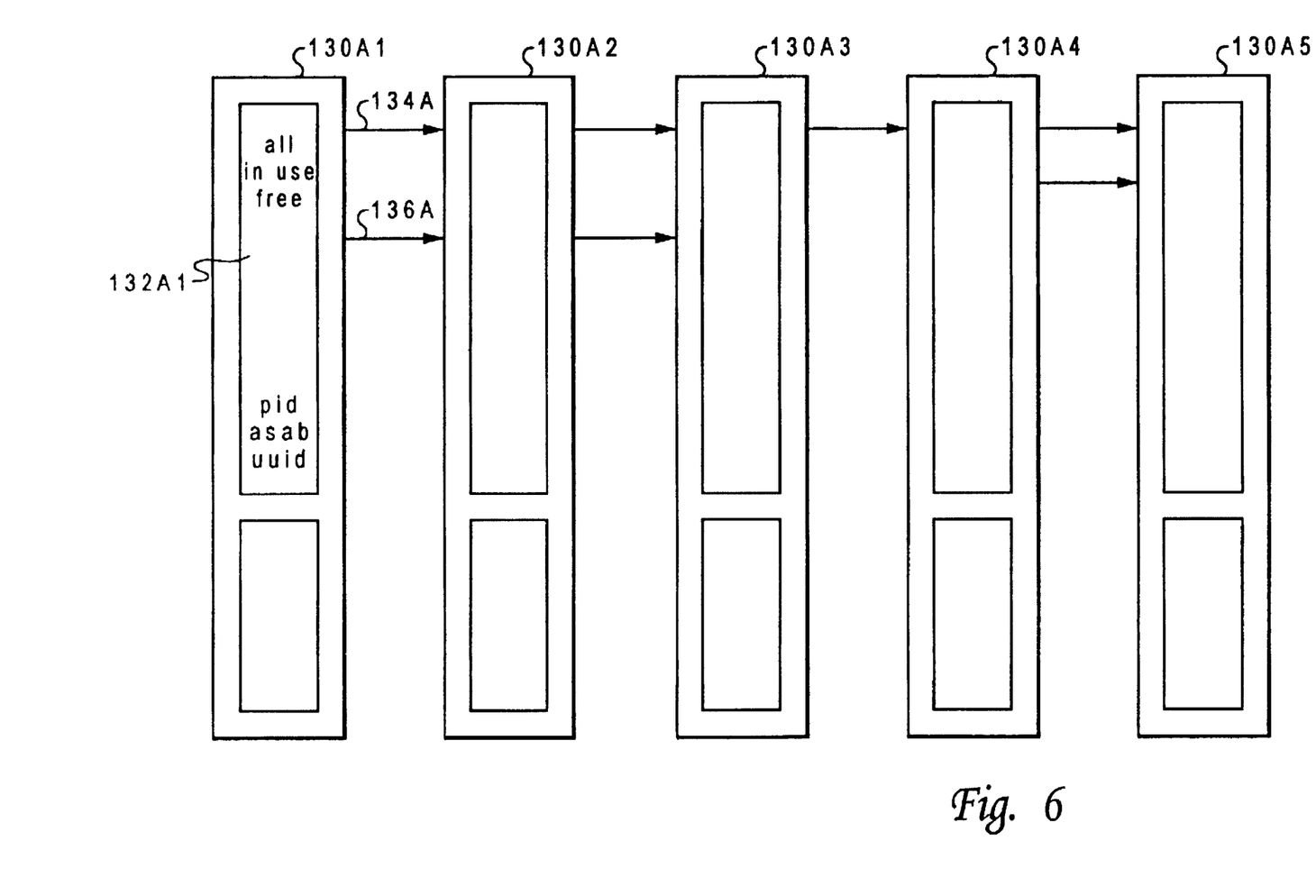
FIG. 6 illustrates agent message queues and agent message queue control blocks for one of the nodes.

The DBM program 102A also reserves a portion of memory, referred to as the FCM shared memory, for sharing among agent and communication processes. Referring now to FIG. 6, part of the FCM memory is established as queues, referred to as agent message queues ("AMQ's") 130A1-A5, for holding messages between agents. The FCM establishes an agent message queue control block ("AMQCB") 132A1 within an AMQ 130A1. An AMQCB may be addressed by a communications handle which the DBM program assigns to the AMQCB on start up.

The AMQCB's are linked together in several ways. The first set of links 134A connect all the AMQCB's. The second set 136A connects the AMQCB's 132A for AMQ's 130A which do not have any agent messages and are not assigned to an agent. These AMQ's 130A linked by the second set of links 136A are referred to as the "free" AMQ's. The third set of links 138A connects the AMQ's which are busy. By referring to these links 134A, 136A, and 138A an agent may determine the status of an AMQ 130A.

The number of AMQ's 130A may be established by the network administrator as a fixed number, or a range for the number of AMQ's may be set and the number may be automatically adjusted by the database manager program. Automatic adjustment of the number of AMQ's is further described below.

Returning now to the description of agent message processing, after initialization, as shown in FIG. 4, requests 100A and 118A are serviced by the agents 104A. Messages are identified and stored for passing among agents according to the following system of queues and addressing (as illustrated in FIG. 7). An AMQ 130A1 is designated for a particular request 118A1 and related subsequent requests by storing the request's UUID 112A1 in the AMQCB 132A1 of the AMQ 130A1 so that the AMQ 130A1 may be located by reference to the UUID 112A1. That is, for example, after a coordinating agent 120A generates an internal request 118A, the FCM 124A processes the internal request 118A1, which includes the FCM putting the internal request 118A into an AMQ 130A1, putting the request's UUID 112A1 into the AMQ's AMQCB 132A1, and putting the communication handle 150A1 for the AMQCB 132A1 into the PDB queue 116A. Referring now to FIG. 6, in selecting an AMQ 130A1 for an internal request 118A1, the FCM 124A searches among the AMQCB's 132A4 and 132A5 of the busy AMQ's 130A4, and 130A5 attempting to find the UUID 112A1, of the internal request 118A1. If the FCM 124A finds the UUID 112A1 in an AMQCB 132A4 or 132A5, the FCM 124A puts the request 118A1 into the associated AMQ 130A4 or 130A5. Otherwise, the FCM 124A puts the request 118A1 into a free AMQ 130A1, 130A2 or 130A3.

Referring again to FIG. 7, once an application request 100A1 has been received, one or more corresponding internal request 118A1 has been generated from the low level requests 108A1, and the internal requests 118A1 have been put into one or more AMQ 130A1, then, when an agent 122A that is seeking to service an internal request 118A1 checks the PDB queue 116A, the agent 122A detects the communications handle 150A1 in the PDB queue 116A and thereby determines that a request 118A1 is waiting. The agent 122A uses the communications handle 150A1 to address the AMQCB 132A1, into which the agent puts its PID 152A7 and from which the agent 122A gets the address of the request 118A in the AMQ 150A1. The agent hen addresses the AMQ 150A1 and gets the internal request 118A.

Figure 8:
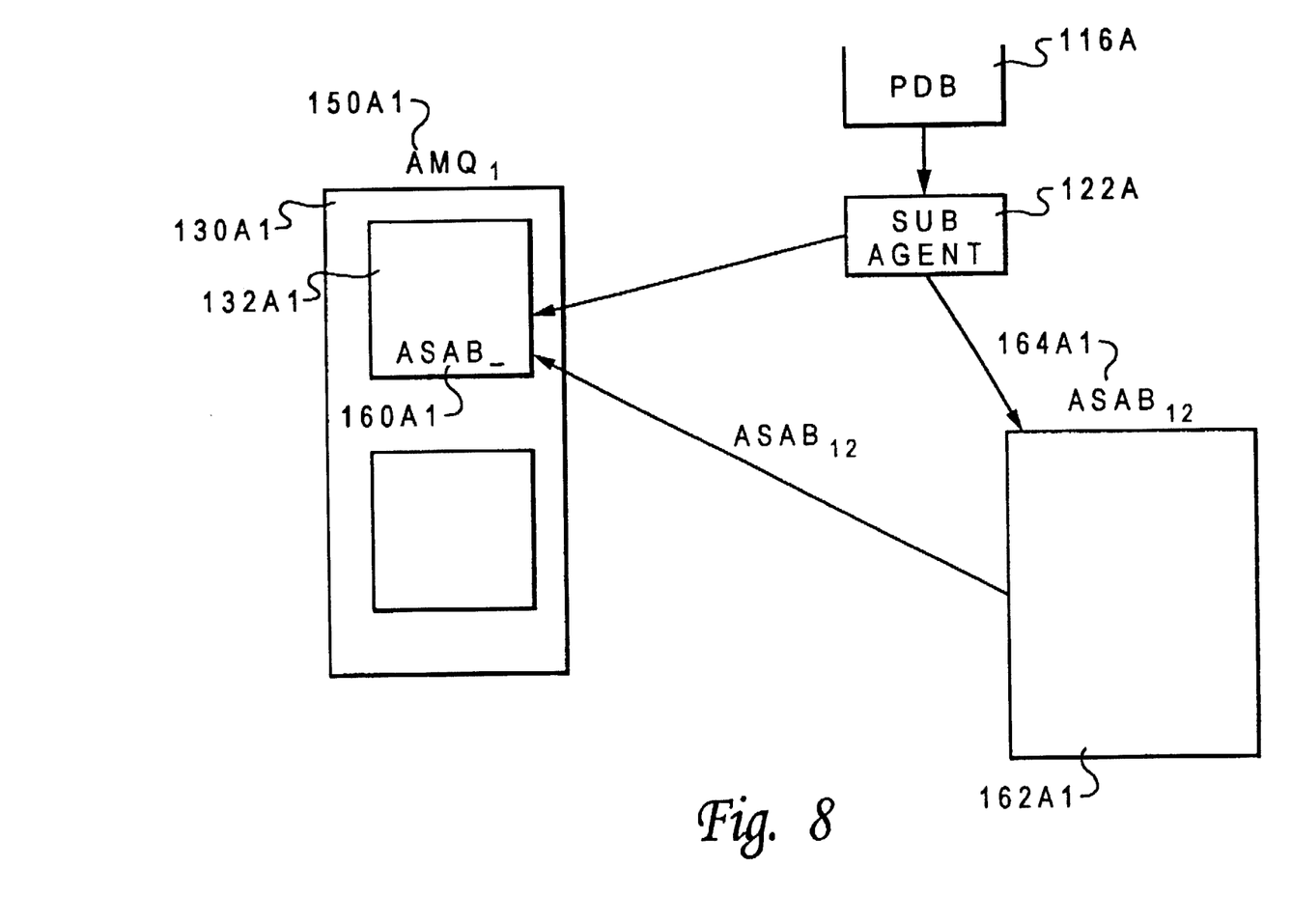
FIG. 8 shows an agent setting up an application state anchor block.

Since a single application request 100A1 may be decomposed into a number of internal requests 108A1 to be executed concurrently, a means is also provided for recording information about the state of the application request 100A1. As shown in FIG. 8, a subordinate agent 122A taking an internal request 118A tests to see whether a data structure, referred to as an application state anchor block (ASAB), has been established for that request. This is tested by looking for an ASAB address 160A1 in the AMQCB 132A1 for the AMQ 130A1 of the request. If an ASAB has not yet been established, the agent establishes the ASAB 162A1 and then stores information about the state of the application request 100A1 from which the internal request 118A derives in the ASAB 162A1. The information stored in the ASAB 162A1 includes the user name, database name, and database state, (including, for example, the cursor location in a database table). The agent also puts the address 164A1 for the ASAB 162A1 into the AMQCB 132A1 for the AMQ 130A1 which the agent 122A is servicing. If the internal request 118A is subsequently processed by other agents 104A1, 104A2, etc. (FIG. 4), when an agent 104 tests to see whether an ASAB 162A1 has been established, the agent 104 will find the ASAB address 164A1 in the AMQCB 132A1 and will thereby determine that an ASAB 162 has been established.

General Description of Load Control

A token scheme limits the number of agents which may process requests concurrently. That is, a network administrator sets the total number of tokens available and an agent must get a token in order to process a request. Variations on this scheme are contemplated wherein different tokens have different priority values so that throughput or response time may be optimized based on historical input/output activity and processor load. An agent may return its token either upon finishing processing or when the agent suspends processing temporarily, such as while waiting for a resource.

General Description of Expandable Agent Pool

A network administrator sets an initial number of agents in 104A1, 104A2 . . . 104B1, 104B2 . . . etc. the pools of agents 104A, 104B, etc. for each node and sets a target minimum number of agents in each pool. Thereafter, the number of agents in the pools may be automatically increased or decreased by the DBM program 102. When all the agents 104 are processing requests 118, and an additional request is received, a new agent 104 is automatically created, provided that enough tokens are available. If, when an agent 104 finishes processing a request 118, there are more agents 104 than the initial number, and if an analysis of the history of requests provides a certain indication, then an agent 104 will terminate itself. The analysis of the history of requests functions to dampen the termination of agents 104. It has a particularly significant effect to terminate an agent 104 when the number of agents 104 is near the minimum number.

Categories of Agents

Figure 9:
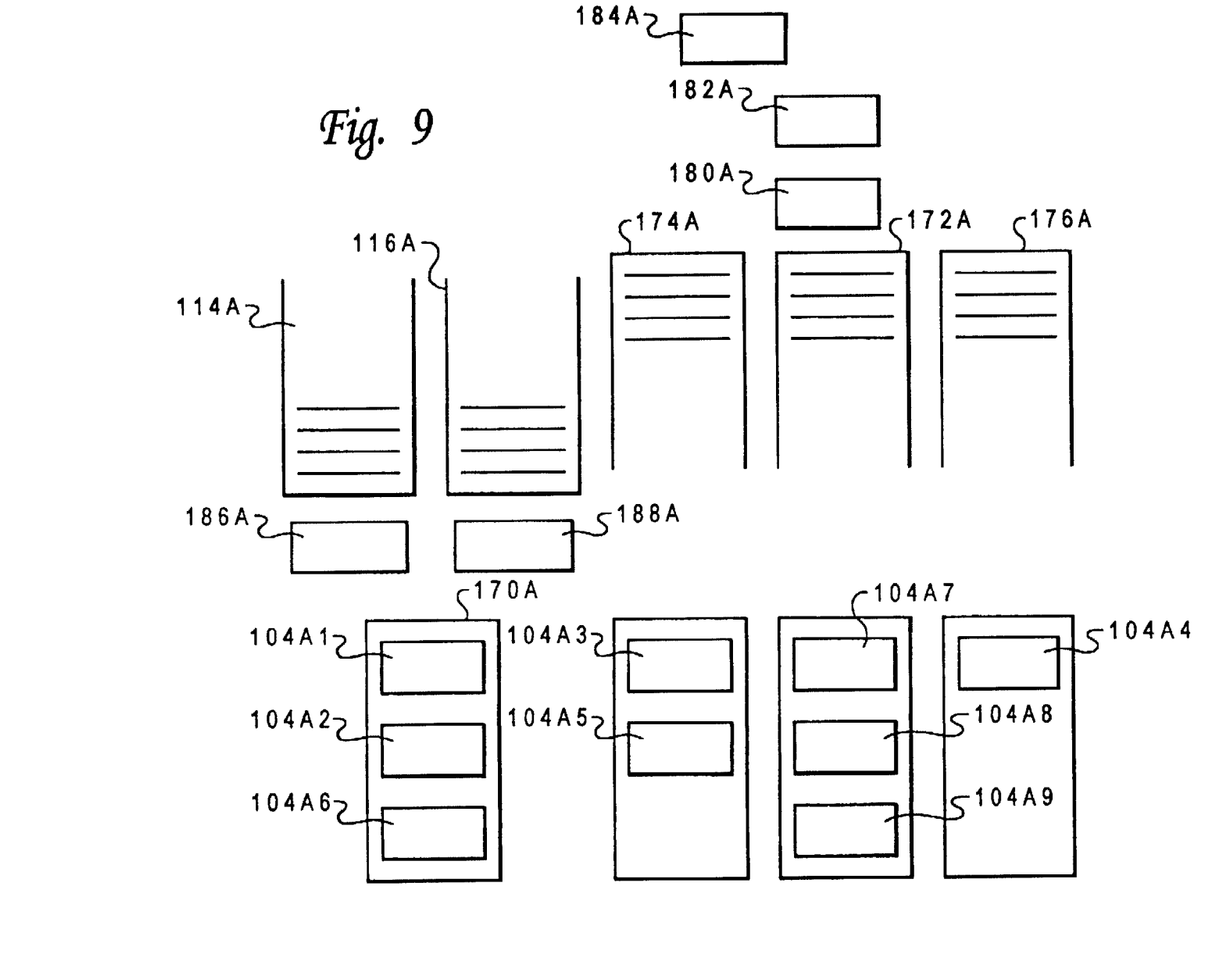
FIG. 9 shows categories of agents and shows counters used in coordinating the agents.

Referring now to FIG. 9, there are four categories of agents 104. First, there is the category of agents which are actively processing a request, or "active" agents 170. In this example, for node 10A there are nine agents 104A1 through 104A9, and attached agents in the other three categories are organized in queues. One queue, the free agent queue 172, is of "free" agents which are waiting for a request. In this example, agents 104A7 through 104A9 are shown as agents in the free agent queue 172A. Another queue, the resume agent queue 174, is of "resuming" agents. In this example, agents 104A3 and 104A5 are shown as agents in the resume agent queue 174A. An agent in the resume agent queue 174A has a request, is not waiting for a resource or event, but is waiting for a token to allow it to begin processing the request. Finally there is the category of blocked agents 176. In this example, agent 104A4 is shown as an agent in the blocked agent queue 176A. An agent in the blocked agent 176A queue has a request but is waiting on a dependency to be resolved, that is, it is waiting on a resource or event. Each agent has an Agent Control Block ("ACB") (not shown) with a flag (not shown) indicating whether an agent is in an active, wait, or sleep state. The free agent queue 172 and resume agent queue 174 are implemented in the DBM program. The blocked agent queue 176 is implemented at the operating system level.

Counting Agents and Tokens

As previously described, the overall number of agents 104 and of tokens may be increased or decreased automatically. Since agents may be created and terminated, an "Agent_count" variable 180A is provided for keeping an account of the total number of agents and a "Min_count" variable 182A is provided for defining the minimum allowable number of agents 104A. Upon start-up, the DBM program creates a number of agents for the pool of agents according to the initial value of Agent_count. Agent_count 180A is incremented or decremented when an agent 104A is created or terminated.

A "Token_count" variable 184A is provided for keeping an account of the number of tokens available and in use. The initial value of Token_count 184A is set by the network administrator to establish the maximum number of tokens. Token_count 184A is decremented if the overall number of tokens is reduced for load control purposes or when an agent 104A takes a token in servicing a request 118A. It is incremented if the number is increased for load control or when an agent 104A gives up or completes a request 118. The minimum allowable value of Token_count 184A is 0.

Queue Structures

For security purposes, the DBM queue 114A is implemented as a system message queue for security purposes. The other queues 116A, 172A, 174A, and 176A may be implemented in shared memory.

The queuing policy varies among the queues. The DBM queue 114A has first-in first-out ("FIFO") queuing. The PDB queue 116A may have FIFO queuing, or, in order to group requests 118A from a transaction together, it may have priority queuing, such as based on a transaction timestamp or on a request identifier. The resume agent ("RA") queue 174A could be FIFO based, but preferably subordinate agents will be given priority over coordinate agents so that internal requests 118A are expedited relative to low level requests 108A.

The DBM and PDB queues 114A and 116A each have a Boolean flag 186A and 188A that indicate whether an agent 104A is waiting for a request from that queue. The DBM flag 186A is referred to as the "DMB_queue_stat." The PDB flag 188A is referred to as the "PDB_queue_stat." One agent, and only one agent may wait for a request 108A from the DMB queue 114A (see coordinate agent 120A, FIG. 4). Likewise, only one agent may wait on the PDB queue 116A (see subordinate agent 122A, FIG. 4).

Getting a Request ("Get_Request")

When an agent is created or when an agent is "waked up" (see below), the agent seeks to service a request. First, the agent latches the PDB_queue_stat flag, and then the agent checks the value of the PDB_queue_stat flag. If the flag indicates that no other agent is waiting on the PDB queue, the agent (call it the "first" agent) unlatches the PDB_queue_stat flag and waits on the PDB queue. If the flag indicates that another agent is waiting, the first agent unlatches the PDB_queue_stat flag and then latches and checks the value of the DBM_queue_stat flag. If no agent is waiting, the first agent unlatches the DBA_queue_stat flag and waits on the DBM queue. If another agent is waiting, the first agent unlatches the DBA_queue_stat flag and then returns to the free queue and sets its own ACB flag forcing the agent to sleep. Once the agent is in the sleep state the operating system may allocate fewer resources to the agent.

The above described Get_Request routine is further illustrated in the following pseudo code:

```
Get-Request:
    latch PDB_queue_stat
    if PDB_queue_stat == 0
        PDB_queue_stat = 1
        unlatch PDB_queue_stat
        (blocking) receive on PDB_req_queue
    else
        unlatch PDB_queue_stat
        latch DBM_queue_stat
        if DBM_queue_stat == 0
            DBM_queue_stat = 1
            unlatch DBM_queue_stat
            (blocking) receive on DBM_req_queue
        else
            unlatch DBM_queue_stat
            add agent to Free_agent_queue
            wait on agent flag
            Get_Request /* or, goto Get_Request (i.e., retry) */
        end if
    end if
End Get_Request
    Waking Up Another Agent ("Wakeup_Free_Agent")
```

As previously described, when a request arrives in the DMB queue or the PDB queue, the FCM puts a AMQCB handle in the queue. When an agent waiting on the PDB or the DBM queue detects the handle in the queue the agent attempts to wake up another agent in the free agent queue by signalling the free agent's flag. If there are no agents in the free agent queue, the first agent checks the Token_count flag. If the value of Token_count exceeds 1, so that there will be a token available even after the first agent takes a token, the first agent creates another new agent.

The Wakeup_Free_Agent routine is further illustrated by the following pseudo code:

```
Wakeup_Free_Agent:
    if (Free_agent_queue not empty)
        signal first agent on Free_agent_queue
    else
        if (Token_count > 1)
            create new agent
            latch Agent_count
            Agent_count++
            unlatch Agent_count
        end if
    end if
End Wakeup_Free_Agent
    Getting a Token ("Get_Token")
```

After a first agent has gotten a request and attempted to wake up another agent, the agent then attempts to get a token. Once the agent has a token it begins processing the request. The agent attempts to get a token according to the following routine:

```
Get_Token:
    latch Token_count
    if Token_count > 0
        Token_count-1
        unlatch Token_count
    else
        add agent to Resume_agent_queue
```

```
            unlatch Token_count
            wait on agent's flag
            Get_Token      /* or, goto Get_Token (i.e., retry) */
        end if
    End Get_Token
        Processing the Request and Releasing the Token
        ("Release_Token")
```

Upon getting a token, the agent begins processing the request. If the agent suspends processing of the request, such as while waiting on a resource or event, then after a predetermined period of time the agent will give up its token and attempt to notify an agent on the resume agent queue. Also, when the agent completes processing of the request, the agent will give up its token and attempt to notify an agent on the resume agent queue. These operations where a token is released are described further in the following pseudo code:

```
    Release_Token:
        latch Token_count
        Token_count++
        unlatch Token_count
        if Resume_agent_queue not empty
            post flag for first agent on Resume_agent_queue
        end if
    End Release_Token
        Freeing the Agent ("Free_Agent")
```

After the agent has released its token and completed its assigned request, the agent frees itself. First, the agent compares the value of Agent_Count with that of Min_count, to see if the number of agents now exceeds the predetermined minimum number of agents. If Agent_Count exceeds the minimum then, unless a damping function preempts, the agent process terminates, thereby releasing resources which are dedicated to the agent. If the agent does not terminate, either because the Agent_Count is less than the minimum number, or because the damping function preempts termination, then the agent reinitializes itself and enqueues itself in the free agent queue. This routine is further illustrated in the following pseudo code:

```
    Free-Agent:
        latch Agent_count
        if ( Agent_count > target minimum and
              damping conditions are not met )
            Agent_count-1
            unlatch Agent_count
            destroy agent    /* this call will not return */
        else
            unlatch Agent_count
            reinitialize agent data structures
        end if
    End Free_Agent
```

If an agent is suspended for a blocking operation (i.e., to wait for a resource or an event) and the agent releases its token, the agent must be waked up when the blocking operation is resolved. The agent then most enqueue in the resume agent queue, get a token, complete the request, release the token, and free itself. This is provided for in the following pseudo code:

```
    Wakeup_Blocked_Agent:
        Get_Token
        complete request
        Release_Token
        Free_Agent
    End Wakeup_Blocked_Agent
        Agent Pseudo Code
        The agent process combines the above routines as follows:
    Agent:
        loop:
            Get_Request
            Wakeup_Free_Agent    /* to get the next request */
            Get_Token
            do request
            Release_Token
            Free_Agent    /* doesn't return if agent terminates */
        end loop
    End Agent
```

What is claimed is:

1. A method for processing data processing application requests in a computer system configured as a plurality of nodes, a node having memory for storing data and a plurality of interacting processes, comprising the steps of:

establishing a portion of computer memory on the nodes as agent message queues ("AMQ's");

receiving an application request by a first process, wherein the application request includes a request that is not specific to the computer system node configuration, the first process acting as a coordinating agent;

requesting the processing of data, including data on a plurality of nodes, ("request data") by an application request originating on a first node, the request data being located on a second node;

generating a first internal request by the coordinating agent processing a low level request compiled from the application request, and adding an access authorization to the low level request, by the coordinating agent, for authorizing access to the request data and an access location for identifying the request data location, so that the internal request is specific to the computer system configuration;

communicating, by the coordinating agent, the internal request to a first fast communication manager process ("FCM") and thence to a second FCM, the second FCM being on the second node, and storing, by the second FCM, the internal request in the selected AMQ, the selected AMQ being on the second node;

retrieving the internal request from the selected AMQ by a second process, the second process acting as a subordinate agent;

generating, by the coordinating agent, a second internal request for the application request, for processing by a second subordinate agent, the second subordinate agent being on a third node;

communicating, by the first FCM, the second internal request to a third FCM, the third FCM being on the third node;

storing, by the third FCM, the second internal request in a second AMQ, the second AMQ being on the third node;

wherein a plurality of internal requests are stored in a plurality of AMQ's, the step of storing an internal request in an AMQ further comprising the steps of:

identifying the internal request with a universal unique identifier ("UUID");

storing the UUID in the AMQ;

designating the AMQ as a busy AMQ;

designating AMQ's not having internal requests as free AMQ's;

testing busy AMQ's on a node, by an FCM having an internal request for storage in an AMQ, to determine if an AMQ has the UUID of the internal request;

selecting a busy AMQ for storing the internal request if the AMQ has the UUID of the internal request; and selecting a free AMQ for storing the internal request if none of the AMQ's tested have the UUID.

2. The method of claim 1 further comprising:

testing for an application state anchor block (ASAB) for recording information about the state of the application request by the subordinate agent that is processing the internal request;

establishing, by the subordinate agent, an application state anchor block if an ASAB has not yet been established for the application request;

storing, by the subordinate agent the address for the ASAB into the AMQ so that any agent subsequently servicing an internal request having the same UUID may determine the existence and address of the ASAB.

3. A system for processing data processing application requests configured as a plurality of nodes, a node having memory for storing data and a plurality of interacting processes, comprising:

a portion of computer memory on the nodes configured as agent message queues;

a coordinating manager for receiving a first one of a plurality of application requests including a format that is not specific to node configuration, and for generating a first one of a plurality of internal requests derived from the application request;

means for identifying each of the internal requests with a universal unique identifier;

means for queuing the first internal request for storage in one of a plurality of selected agent message queues;

means for designating the agent message queues as busy agent message queues;

a subordinate agent for retrieving the first internal request from the selected agent message queue;

a first fast communication manager for sending the first internal request for storage in the agent message queue;

means for processing of requested data, including data located on a plurality of nodes, to fulfill the application request which originates on a first node, the requested data being located on a second node;

an authorization facility for authorizing access to the requested data;

means for providing an access location for identifying the requested data location, so that the first internal request is specific to the computer system configuration;

a second fast communication manager on the second node for storing the internal request in the agent message queue being on the second node; and a third fast communication manager for sending the second internal request to a second agent message queue, the third fast communication manager being on the third node, wherein the coordinating manager generates a second internal request for the application request for processing by a second subordinate agent process, the second subordinate agent process being on a third node and wherein the first fast communication manager communicates the second internal request to a third fast communication manager.

4. The system of claim 3 further comprising:

means for designating agent message queues not having an internal request as free agent message queues;

means for testing busy agent message queues on a node, by a fast communication manager having an internal request for storage in an agent message queue, to determine if an agent message queue has the universal unique identifier of the internal request;

means for selecting a busy agent message queue for storing the internal request if the agent message queue has the universal unique identifier of the internal request; and means for selecting a free agent message queue for storing the internal request if none of the agent message queues tested have the universal unique identifier.

5. The system of claim 4 further comprising:

means for testing for an application state anchor block for recording information about the state of the application request by the subordinate agent that is processing the internal request; and means for establishing an application state anchor block if an application state and anchor block has not yet been established for the application request.

* * * * *